No. 801,596. PATENTED OCT. 10, 1905.
J. J. KERR, W. H. HARDY & G. H. PROVANCE.
CLAMP.
APPLICATION FILED FEB. 16, 1905.
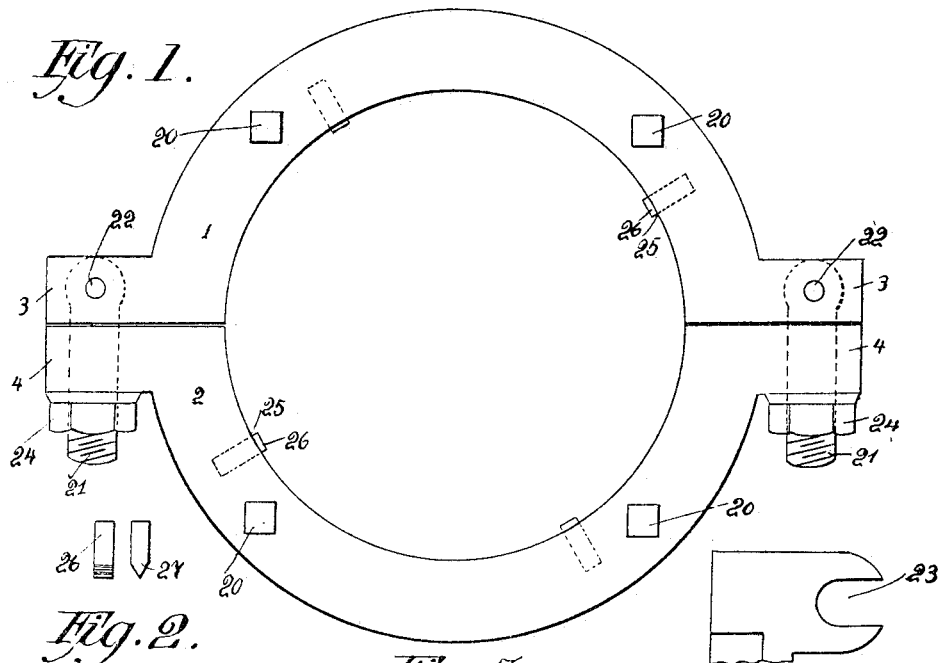
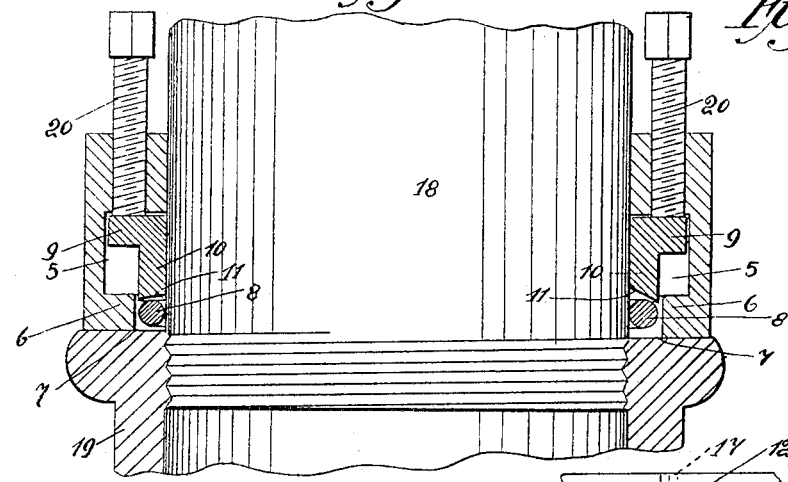
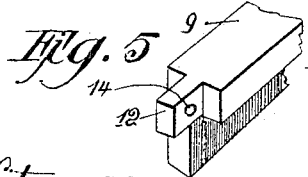
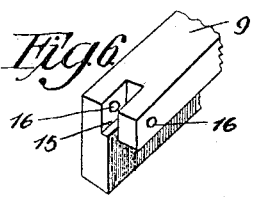
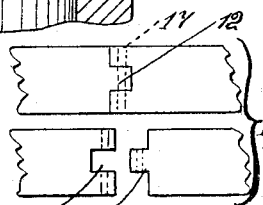
Witnesses
Inventors,
J. J. Kerr,
W. H. Hardy,
G. H. Provance,
By Attorneys

UNITED STATES PATENT OFFICE.

JESSE J. KERR, WILLIAM H. HARDY, AND GEORGE H. PROVANCE, OF DUNBAR, PENNSYLVANIA.

CLAMP.

No. 801,596.     Specification of Letters Patent.     Patented Oct. 10, 1905.

Application filed February 16, 1905. Serial No. 245,881.

*To all whom it may concern:*

Be it known that we, JESSE J. KERR, WILLIAM H. HARDY, and GEORGE H. PROVANCE, citizens of the United States of America, residing at Dunbar, in the county of Fayette and State of Pennsylvania, have invented certain new and useful Improvements in Clamps, of which the following is a specification, reference being had therein to the accompanying drawings.

This invention relates to certain new and useful improvements in clamps for steam-pipes and the like, and has for its object to provide a novel form of clamp which is adapted to be used for checking or entirely stopping leakages that occur in the joint of two pipes.

Another object of this invention is to provide a novel form of clamp which can be easily and quickly secured upon a leaking joint and adjusted thereon to entirely stop the leakage of said joint. The construction of our improved clamp enables us to manufacture the same at a comparatively small cost on account of the simplicity of the clamp. A clamp constructed in accordance with our invention is strong and durable and highly efficient for the purpose for which it is intended.

Briefly described, our improved clamp comprises two sections which are adapted to be secured together upon a pipe-section adjacent to the joint of said pipe with another pipe, and said sections are provided with a substantially circular groove in which is mounted a gland that is adapted to engage suitable stuffing material mounted within said clamping-sections. A plurality of set screws or bolts are employed for securing the gland in engagement with the stuffing material, whereby the leakage of the joint can be eliminated.

The above construction will be hereinafter more fully described and then specifically pointed out in the claim, and, referring to the drawings accompanying this application, like numerals of reference designate corresponding parts throughout the several views, in which—

Figure 1 is a top plan view of our improved clamp. Fig. 2 is a detail view of dowel-pins used in connection with the clamp. Fig. 3 is a vertical sectional view of our improved clamp as secured upon the joint of two pipes. Fig. 4 is a fragmentary side elevation view of a portion of one of the clamping-sections. Figs. 5 and 6 are detail perspective views of the ends of our improved gland. Fig. 7 is a top plan view thereof, and Fig. 8 is a detail view of one form of stuffing material which we may use in connection with our improved gland.

To put our invention into practice, we have employed a clamp comprising two sections 1 and 2, which are substantially simicircular in top plan view, and the ends of said sections are provided with outwardly-extending lugs 3 3 and 4 4, which are adapted to oppose one another when said sections are secured together. Each section is provided in its inner face with a substantially simicircular groove 5, that is preferably formed near its lower edge. The formation of said grooves provides a flange 6, which is cut away, as indicated at 7, to accommodate suitable stuffing material 8.

In the grooves 5 is mounted a gland 9, said gland being substantially angular in cross-section and having a depending flange 10, the lower face of which is beveled, as indicated at 11. The gland is preferably formed of a resilient material which can be bent to conform to the grooves 5 in which it is mounted, and the ends of said gland and the manner of securing them together are illustrated in Figs. 5 to 7, inclusive. The one end of the gland is provided with a tongue 12, having an aperture 14 formed therein, while its opposite end is provided with a slot 15, the sides of which are provided with apertures 16 16, whereby a pin 17 can be inserted in the apertures 16 and 14 to firmly secure the ends of said gland together to form an annulus.

The stuffing material or packing which is preferably employed is rubber; but we may employ other material which is suitable for stopping the leakage of a joint. The form of stuffing material illustrated comprises a rubber gasket, which is mounted in the opening formed by the cut-away portion 7 of the flange 6, and by referring to Fig. 3 of the drawings it will be observed that the gasket is mounted in close proximity to the joint of the pipe-section 18 with the pipe-section 19.

To retain the stuffing material or rubber gasket in engagement with the joint of said pipes, we have provided a plurality of set screws or bolts 20, which pass into the sections 1 and 2 and are adapted to engage the outer faces of the gland 9. By adjusting the set-screws 20 the gland can be forced into engagement with the joint existing between the pipe-sections 18 and 19.

To retain the sections 1 and 2 upon the pipe-section 18, we have provided the lugs 3 3 with stud-bolts 21 21, that are pivoted by pins 22 22 within suitable recesses formed in the lugs 3 3. The lugs 4 4 are slotted, as indicated at 23, in order that the section 2 of our improved clamp may be secured upon the pipe-section 18 and clamped thereon by nuts 24 24, that are placed upon the pivoted stud-bolts 21 21.

The inner faces of the clamping-sections are provided with a plurality of recesses 25, in which are mounted dowel-pins 26, and these dowel-pins are adapted to engage the pipe-section 18 and prevent any longitudinal or rotary movement of the clamp upon the pipe-section. In Fig. 2 of the drawings we have illustrated a modified form of dowel-pin, which is designated by the reference-numeral 27. In Fig. 8 of the drawings we have illustrated a section of rubber gasket the ends of which are cut away at an angle, as indicated at 28, whereby the ends of said gasket can be overlapped and firmly held together.

When the clamping-sections 1 and 2 have been provided with dowel-pins 26 and have been firmly clamped upon the pipe-section, it will be impossible for any movement of the clamp to occur, and by adjusting the set-screws 20 sufficiently the rubber gasket or stuffing material can be held firmly in engagement with the joint of the two pipe-sections and a positive and permanent elimination of the leak of a pipe-joint accomplished.

We do not care to confine ourselves to the particular number of dowel-pins, set-screws, nor to the particular type of gland and stuffing material that may be used, nor to the size or material from which the different parts of our improved clamp may be made, as the above changes can be made without departing from the general spirit and scope of the invention.

What we claim, and desire to secure by Letters Patent, is—

The combination with two pipe-sections joined together, of a clamp comprising two sections secured together, said clamp mounted on one of the pipe-sections and abutting against the end of the other pipe-section, means carried by said clamp-sections and projecting beyond the inner circumference thereof to engage the pipe-section on which the clamp is mounted, a packing arranged within the clamp and surrounding the pipe-section on which the clamp is mounted, and adapted to lie against the joint between said pipe-sections, a gland arranged within a groove provided therefor in the clamp-sections and having a beveled face bearing against said packing and means extending through the outer face of the clamp and engaging said gland to compress the packing, substantially as described.

In testimony whereof we affix our signatures in the presence of two witnesses.

JESSE J. KERR.
WILLIAM H. HARDY.
GEORGE H. PROVANCE.

Witnesses:
W. H. WILLIAMS,
THOMAS TURNER.